(12) United States Patent
Natarajan et al.

(10) Patent No.: US 12,164,355 B2
(45) Date of Patent: Dec. 10, 2024

(54) APPARATUS AND METHOD TO REDUCE STANDBY POWER FOR SYSTEMS IN BATTERY MODE WITH A CONNECTED BUS POWERED DEVICE

(71) Applicant: Intel Corporation, Santa Clara, CA (US)

(72) Inventors: Udaya Natarajan, El Dorado Hills, CA (US); Kannappan Rajaraman, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 685 days.

(21) Appl. No.: 17/203,561

(22) Filed: Mar. 16, 2021

(65) Prior Publication Data

US 2021/0208668 A1 Jul. 8, 2021

(51) Int. Cl.
*G06F 1/3215* (2019.01)
*G06F 1/26* (2006.01)
(Continued)

(52) U.S. Cl.
CPC ............ *G06F 1/3215* (2013.01); *G06F 1/266* (2013.01); *G06F 1/3253* (2013.01);
(Continued)

(58) Field of Classification Search
CPC .... G06F 1/3296; G06F 1/3215; G06F 1/3287; G06F 1/266; G06F 1/3252; G06F 9/4418; G06F 2213/0042; Y02D 10/00
See application file for complete search history.

(56) References Cited

U.S. PATENT DOCUMENTS

| 8,452,995 B1 | 5/2013 | Lachwani et al. |
| 2003/0110403 A1 | 6/2003 | Crutchfield et al. |

(Continued)

FOREIGN PATENT DOCUMENTS

| JP | 2007047909 A | 2/2007 |
| JP | 2016139376 A | 8/2016 |

OTHER PUBLICATIONS

European Search Report issued Dec. 13, 2022 for EP Application No. 22156160.8, 27 pages.
(Continued)

*Primary Examiner* — Glenn A. Auve
(74) *Attorney, Agent, or Firm* — Schwabe, Williamson & Wyatt, P.C.

(57) ABSTRACT

A power saving apparatus and method for a host system to proactively decide to save power and increase battery life when bus powered peripheral devices are connected to the System's USB TYPE-C ports. The Host (or Host System) decides if a Bus Powered Device (BPD), hub or a peripheral device requires application services, or a device-initiated wake based on wake policies of a respective Universal Serial Bus (USB) 3.2, THUNDERBOLT 3 (TBT3), USB4, DISPLAYPORT (DP) Protocol. Thereafter, the Host decides based on S0, Low Power System standby entry—wake time latency requirement along with USB TYPE-C IO Protocol policies, to trigger the system power delivery (PD) Controller to remove power to the BPD. To save power, the Host System Wake logic power partition is also powered off.

20 Claims, 6 Drawing Sheets

(51) Int. Cl.
*G06F 1/3234* (2019.01)
*G06F 1/3287* (2019.01)
*G06F 1/3296* (2019.01)
*G06F 9/4401* (2018.01)

(52) U.S. Cl.
CPC .......... *G06F 1/3287* (2013.01); *G06F 1/3296* (2013.01); *G06F 9/4418* (2013.01); *G06F 2213/0042* (2013.01); *Y02D 10/00* (2018.01)

(56) References Cited

U.S. PATENT DOCUMENTS

| | | | |
|---|---|---|---|
| 2004/0042138 A1 | 3/2004 | Saito et al. | |
| 2014/0208134 A1* | 7/2014 | Waters | G06F 13/4282 713/310 |
| 2016/0028250 A1* | 1/2016 | Patnaik | H02J 7/00 710/16 |
| 2018/0341315 A1* | 11/2018 | Suganuma | G06F 1/3253 |
| 2018/0356873 A1* | 12/2018 | Regupathy | G06F 1/3253 |
| 2019/0294228 A1 | 9/2019 | Tamura et al. | |
| 2019/0310700 A1* | 10/2019 | Waters | G06F 1/3243 |
| 2019/0369708 A1* | 12/2019 | K | H02J 9/005 |
| 2020/0272592 A1* | 8/2020 | Chan | G06F 13/4282 |
| 2020/0287454 A1* | 9/2020 | Lee | G06F 13/4282 |
| 2020/0310512 A1* | 10/2020 | Mills | G06F 1/3206 |
| 2021/0208648 A1* | 7/2021 | Venkideswaran | H02J 7/007192 |
| 2021/0405732 A1* | 12/2021 | Amireddy | G06F 1/3296 |
| 2022/0197364 A1* | 6/2022 | Gopalakrishnan | G06F 13/4282 |
| 2022/0197842 A1* | 6/2022 | Regupathy | G06F 13/385 |

OTHER PUBLICATIONS

Extended European Search Report issued Apr. 26, 2023 for EP Application No. 22156160.8, 18 pages.
Apple Inc., "Universal Serial Bus 3.2 Specification", Sep. 22, 2017 (Sep. 22, 2017), XP093026712, Retrieved from the Internet: URL:https://www.scribd.com/document/489573353/USB-3-2-Revision-1-0#, retrieved Feb. 24, 2023, 399 pages.
Apple Inc., "Universal Serial Bus 4 (USB4 (TM)) Specification", Aug. 31, 2019 (Aug. 31, 2019), XP093026766, Retrieved from the Internet: URL: https://caxapa.ru/thumbs/945953/USB4_1.0_20190829.pdf, retrieved on Feb. 24, 2023, 91 pages.
Office Action issued Oct. 8, 2024 for EP Application No. 22156160.8, 5 pages.

* cited by examiner

APPARATUS AND METHOD TO REDUCE STANDBY POWER FOR SYSTEMS IN BATTERY MODE WITH A CONNECTED BUS POWERED DEVICE

BACKGROUND

Computer and electronic handheld devices have ports for data exchange and power delivery such as Universal Serial Bus (USB) TYPE-C ports with power delivery (PD) controller and components to power a system and charge a battery. The system in this condition is called a sink or consumer mode device. Similarly, the system can power devices connected at its Type C ports to enumerate for functionality. Ibis mode of operation is called source or provider role of the system. In a battery only powered system, keeping a bus powered device (BPD) or Hub connected on the system ports comes at the expense of system battery life.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
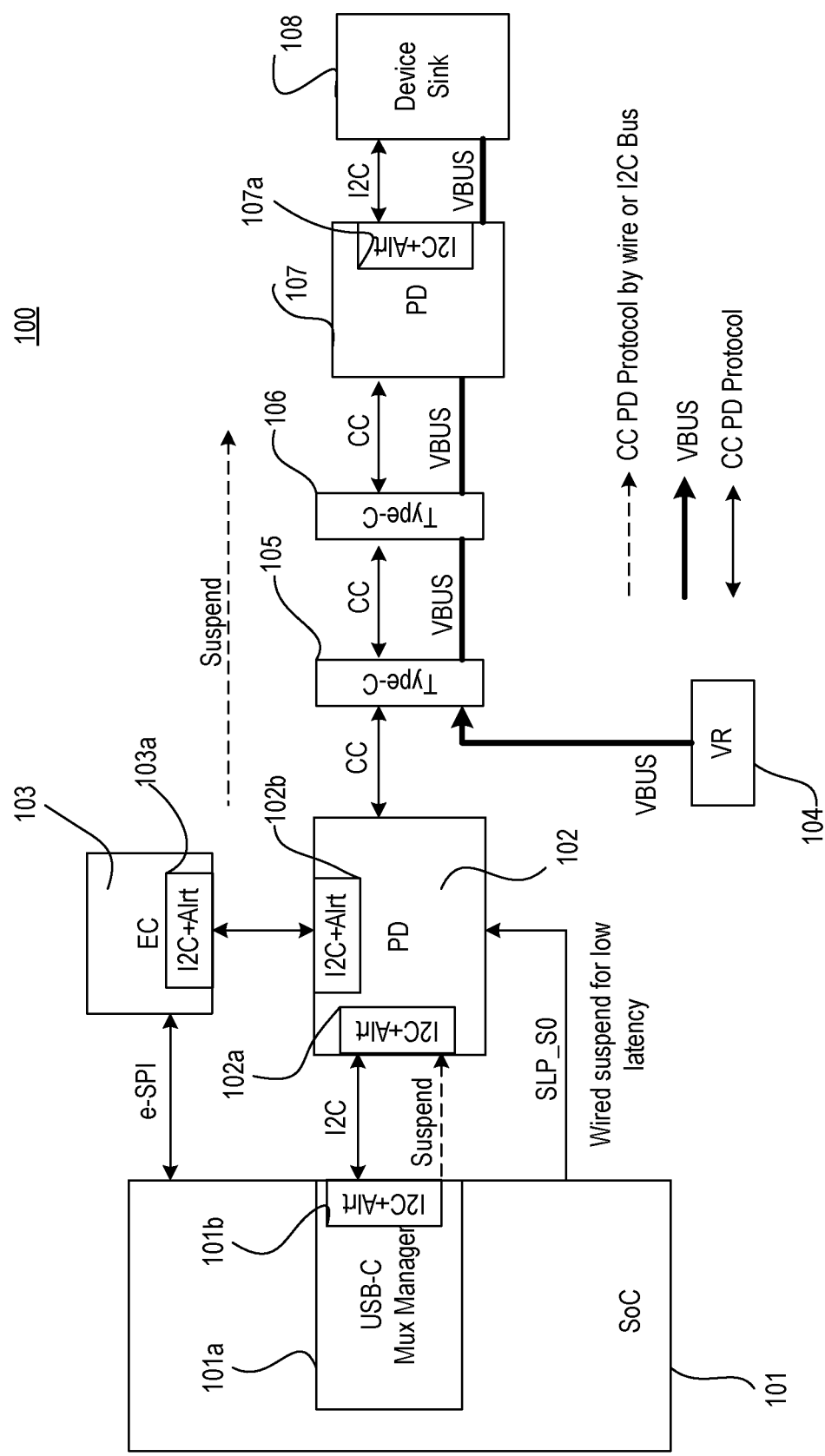
FIG. 1 illustrates a system showing a host and a sink device connected via a USB TYPE-C port, with in-band or GPIO communication for standby indication to PD controller, in accordance with some embodiments.

As discussed herein, in a battery only powered system, keeping a bus powered device (BPD) or Hub connected on the system ports comes at the expense of system battery life. In such cases, when the services from the device are not necessary, the system has the opportunity to switch off completely the power delivery to the BPD. This system power saving feature is available when the system is operational (e.g., system is in S0 state) while not actively running applications using the attached BPD or servicing any potential device-initiated wakes. This power saving is applicable even when the system is in Sleep state (e.g., System Sx or low power states S0ix states) when the device does not require any active services from the BPD devices with potential device-initiated wakes.

Currently, there is no known solution for a system host in active S0 mode as well in ACPI standby Sx modes to proactively cut the power to a bus-powered device or Hub when it does not require any application or wake services from the connected devices. Also, when the System is in standby modes, with BPD or HUB connected, there is currently no known solution to remove power on the Host System's internal wake logic power plane if the port partner does not require a device-initiated wake.

Some embodiments provide a power saving apparatus and method for a host system to proactively decide to save power and increase battery life when bus powered peripheral devices are connected to the System's Type C ports. In some embodiments, the Host (or Host System) decides if a BPD, hub or a peripheral device requires application services, or a device-initiated wake based on wake policies of a respective USB 3.2, THUNDERBOLT3 (TBT3), USB4, DISPLAYPORT (DP) Protocol. In some embodiments, thereafter, the Host decides based on S0, Low Power System standby entry—wake time latency requirement along with USB TYPE-C IO Protocol policies, to trigger the system power delivery (PD) Controller to remove power to BPD. In some embodiments, to save power, the Host System Wake logic power partition is also powered off.

There are many technical effects of the various embodiments. For example, the power saving apparatus and/or method extends battery life of the System per charge cycle enabling user to have a longer computer access time on a battery. The apparatus and method of various embodiments save energy across multiple ports on a System connected with BPD. The apparatus and method of various embodiments avoid dead battery scenario when a user forgets and leaves a BPD or HUB connected from a battery powered system. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

USB TYPE-C connector supports three main IO links: USB 3.2, USB4, and DISPLAYPORT (DP). These protocols define low power IO link state when an IO Link is not in functional state as well as when a system is in sleep or standby conditions. USB4 and DP have a sideband link for command control to bring up the main link training, whereas USB 3.2 is in band. Each IO protocol has policies for remote device-initiated wake. The following section outlines the IO protocol and/or policies for USB 3.2, USB4, and DP.

For USB 3.2 (USB3.2), an attached device or Hub can enter suspend state when the upstream link connected to the Host enters U3. A device can exit to link up from suspend through in-band LFPS [Low Frequency Periodic Signaling] communication to provide the services to a Host in active S0 state. If the Host is in low power ACPI suspend states [S3, S4, S5], the attached device initiating LFPS will trigger the Host system to exit low power state and then bring the USB link up. To service such wakes in low power state many of the System and device internal wake power planes must be powered resulting in battery drain. Such device-initiated wakes in most practical application happen very rarely in USB BPD devices. In system active and low power state, a connected BPD or Hub and the system wake logic power planes together consume power from the system battery. Connecting such as device overnight to a battery only powered system can drain the battery resulting in dead battery condition.

In some embodiments, the apparatus and method of various embodiments uses a user preference Application Programming Interface (API) to enable and disable the power saving feature. The API interface implements a software switch to turn on or off the wake power planes for a device-initiated wake service requirement during a battery powered system condition. For BPD or hubs that do not require device-initiated wake, which depends on System or Host initiated wake, the Host can power off the connected devices including host system wake logic power plane(s). Since the Host has full control of the wake sequence, it can power up the BPD or HUB first before initiating the enumeration process. This process saves power when a user has left a BPD or Hub connected to the USB TYPE-C port The powering sequence of the BPD or Hub port partner is managed to meet low power link exit latency. U1 and U2 link states are not considered in this disclosure since they have very low latency exit time based on Latency Tolerance limits. For U3 exit, latency of 10 ms to bring the link up is applicable when the system is in active S0 mode. The 10 ms stringent time requirement for USB U3 wake is applicable in System active S0 mode limited by USB link bring up time. Note, the USB specification defines four link power states known as U states, from U0 to U3. An active link is in state U0.

If the USB controller entered D3 state, then the latency tolerance is infinite and is less stringent for the wake time. When a Host is in System standby mode and a wake is triggered by a USB device, the latency for bringing up the USB link is limited by System standby wake latency tolerance which is higher than 10 ms. This exit latency tolerance is further relaxed, when the System is in ACPI Sx mode, where it is limited by operating system (OS) and/or Driver boot time. Note, device states D0-D3 are device dependent states, and defined by the ACPI specification. D0 or Fully On is the operating state, D1 and D2 states are intermediate power-states whose definition varies by device, D3 state is further divided into D3 Hot (has auxiliary power), and D3 Cold (no power provided), where in D3 Hot, a device can assert power management requests to transition to higher power states while in D3 Cold or Off, the device is powered off and unresponsive to its bus. For all the above three system conditions namely S0 active, Standby and ACPI Sx, a host system-initiated wake (Note a device generally does not possess wake capability) provides an opportunity to decide cutting power off to the BPD.

USB 3.2 Specification, through Host Standard Device Request definition/descriptor and subsequent Standard Feature selectors, defines if a device is remote wake capable with "DEVICE_REMOTE_WAKEUP" flag. Various embodiments uses this flag as a decision indicator in the Host System Power Management software scheme to decide whether to keep the system wake logic power plane, the BPD and HUB power on or off during system low power modes.

For USB4 (USB4), USB4 Link Standby entry is managed by USB4 Connection Manager (CM) by negotiating with the BPD or Hub port partner over its side band SB link. Next, the Host can reduce the power contract with the BPD port partner by PD Protocol. While resuming from low power mode, PD contract with required power delivery to the BPD is established prior to link bring up. Like the USB 3.2 wake protocol, the Device wake delay latency is constrained by PD power contract and the time to meet USB4 wake latency time requirements. If it is Host based wake or a wake from system ACPI Sx states, there is no latency constraint. Host has control of the USB4 link bring up after the complete boot to OS in the case of Sx exit. Based on the USB 3.2 application analogy, a user preference API interface can be provided to turn off or on attached device power and Host wake power planes for a not required or required device-initiated wake service during a battery powered system condition respectively. For BPD or hubs that do not require device-initiated wake, which depends on System or Host initiated wake, the Host can power off the connected devices and its system wake logic power plane. Since the Host has full control of the wake sequence, the Host can power up the BPD or HUB first before initiating the enumeration process. This saves power when a user has left a BPD or Hub connected to the USB TYPE-C port USB4 Specification, through Router Configuration Space Basic Attributes with "Enable Wake on PCIe, USB3, DP definition, defines the requirement for device remote wake. Various embodiments use this feature as a decision indicator in the Host System software scheme to decide whether to keep the system wake logic power plane, the BPD and HUB power on or off during system low power modes.

For DISPLAYPORT (DP), the Display wake is controlled from the Source and not from the Sink. Moreover, the DP sink is self-powered. In the cases of USB TYPE-C to display Dongle, the System decides to power the dongle. The concept listed for USB 3.2 and USB4 Host base wake is also applicable in the case of DP Dongle usage. For BPD or hubs that do not require device-initiated wake which depends on System or Host initiated wake, the Host can power off the connected devices and its system wake logic power plane. Since the Host has full control of the wake sequence, the host can power up the BPD or HUB first before initiating the enumeration process. This saves power when a user has left a BPD DP dongle connected to the Type C port DP specification describes that wake is always Host wake initiated. The Host DP Source controls by writing to DPCD SET Power and SET_DP_PWR_VOLTAGE register. HPD_IRQ wake from panel is not supported since when the Host system goes to low power ACPI Sx states. The Host is aware of initiating low power to DP panel link port partner and the corresponding Bus powered DP Dongle. Various embodiments use this DPCD feature for the Host System software scheme to decide whether to keep the system wake logic power plane, the BPD and HUB power on or off during system low power modes.

FIG. 1 illustrates system 100 showing a host and a sink device connected via a USB TYPE-C port, with in-band or GPIO communication for standby indication to PD controller, in accordance with some embodiments. System 100 comprises SoC 101 (e.g., SoC of FIG. 6) having USB TYPE-C Multiplexer manager 101a and I2C and other alternative ports (Alt port) 101b, Host PD controller 102 having I2C and Alt ports 102a and 102b, embedded controller (EC) 103 having I2C and Alt ports 103a, voltage regulator (VR) 104, Host USB TYPE-C port interface 105, Device USB TYPE-C port 106, device PD 107 having I2C and Alt port 107a, and Device Sink 108. SoC 101 communicates with Host PD controller via I2C bus. SoC 101 communicates with EC 103 via e-SPI (enhanced serial peripheral interface). Host PD controller 102 communicates with EC 103 via I2C interfaces 102b and 103a, respectively. Host USB TYPE-C port communicates with Host PD 102 via communication channel (CC). Host USB TYPE-C port communicates with device USB TYPE-C port via CC. Device USB TYPE-C port communicates with device PD controller 107 via CC. Device PD controller 107 communicates with Device Sink 108 via I2C. VR 104 provides power supply VBUS to Host USB TYPE-C port 105, device USB TYPE-C port 106, device PD controller 107, and Device Sink 108. In various embodiments, the power saving scheme is implemented as hardware, software, and/or a combination of them on SoC 101. The various flowcharts discussed herein can be implemented as hardware, software, and/or a combination of them on SoC 101.

Figure 2:
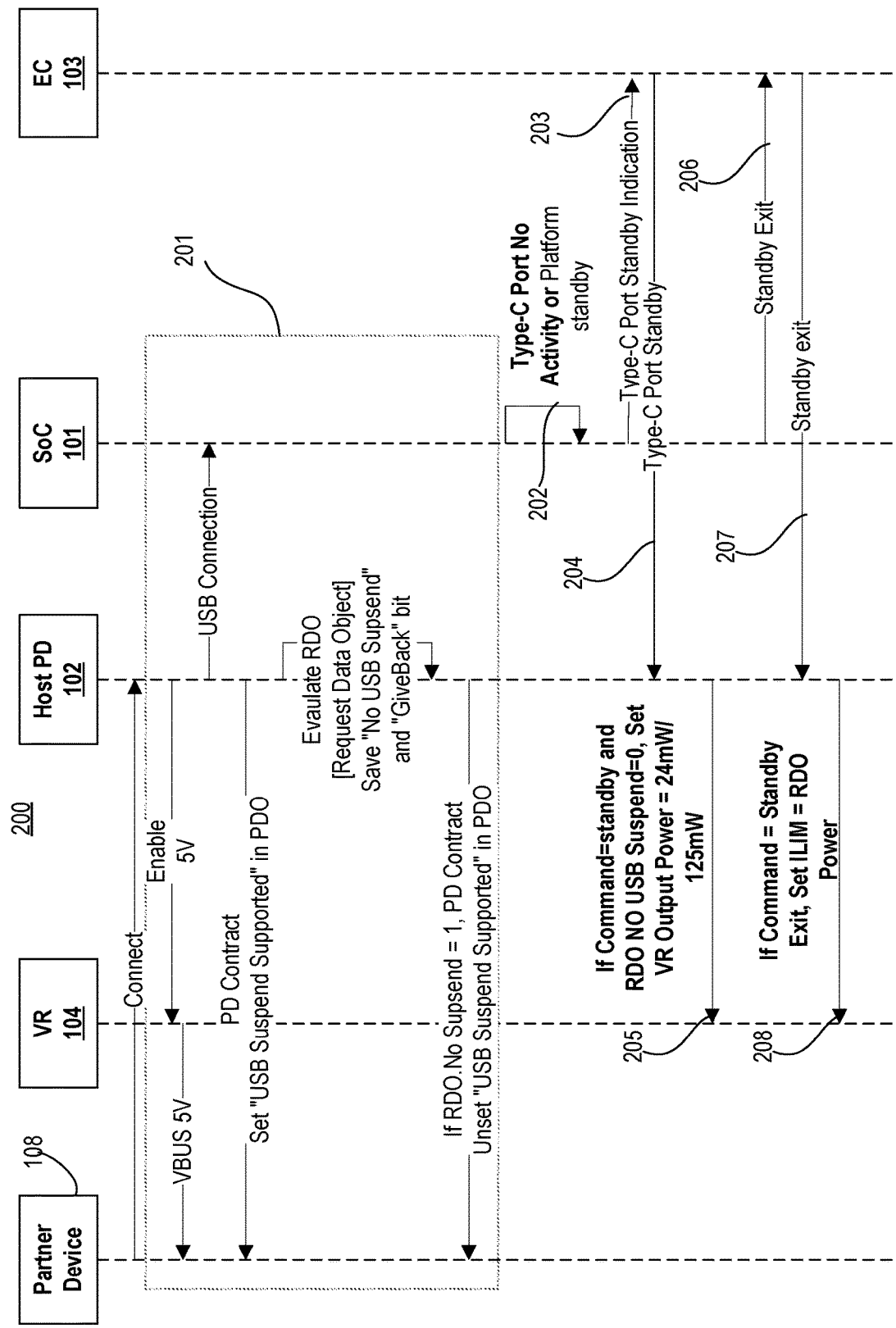
FIG. 2 illustrates a flowchart of a standby sequence from system-on-chip (SoC) to bus powered device (BPD) for low latency exit device wake requirement, in accordance with some embodiments.

FIG. 2 illustrates flowchart 200 of a standby sequence from system-on-chip (SoC) to bus powered device (BPD) for low latency exit device wake requirement, in accordance with some embodiments. While the blocks are shown in a particular order, the order can be modified. For example, some blocks may be performed in parallel, while some blocks can be performed before others. The various blocks can be performed by software, hardware, or a combination of then. Flowchart 200 describes host system entering shallow (low) latency entry/exit standby with device-initiated wake requirement by directing port partner PD enter standby mode (e.g., 25 mW or 125 mW modes). Note, 25 mW is used for regular consumer device while 125 mW is used for hub-based device.

In this case, Host SoC 101 discovers that Device initiated wake is necessary. Due to the low latency wake exit criteria, Host SoC 101 can either use I2C in-band or a hardwire communication to its PD Controller 102. Host SoC 101 uses the interface to set "RDO No USB Suspend" to drive the BPD/HUB (i.e., partner device 107/108) to standby modes to reduce power consumption to PD specified at 25 mW/125 mW power drain limit, respectively. Exit latency is dependent on the Host PD Controller 102 by renewing the prior Power contract. This sequence is illustrated by FIGS. 1-2.

Host PD 102 first becomes aware of partner device 108 being connected to USB TYPE-C port 105. Thereafter, PD contract is made between SoC 101 and Partner Device 108 as illustrated by set of handshakes between Partner Device 108, VR 104, Host PD 102, and SoC 101. These set of handshakes are indicated by set of operations 201. In the set of operations 201, Host PD 102 instructs VR 104 to enable 5V supply on VBUS. VR 104 then provides a regulated 5V supply on VBUS to sink device or partner device 108. Once partner device 108 is powered, Host PD controller 102 informs SoC 101 that a USB connection between SoC 101 and partner device 108 is established. A power delivery contract (PD contract) is established between Host PD controller 102 and partner device 107/108. In this contract, USB Suspend Supported is set in PDO by Host PD controller 102. Host PD controller 102 then evaluates the request data object (RDO) and saves the "No USB Suspend" and "GiveBack" bit. Host PD controller 102 then determines if RDO "No USB Suspend" bit is a 1, and if it is, Host PD controller 102 unsets "USB Suspend Supported" bit in PDO and informs that to partner device 107/108.

After completing the set of operations 201, SoC 101 determines whether there is any activity on the USB TYPE-C port 105 or whether the platform is in standby state as indicated by operation 202. SoC 101 then sends the USB TYPE-C Port Standby indication to EC 103 as indicated by operation 203. In operation 204, EC 103 sends the USB TYPE-C Port Standby indication to Host PD controller 102. Host PD controller 102 then determines whether the Command is standby and that RDO No USB Suspend bit is set to 0, and if that is the case, Host PD controller 102 instructs VR 104 to output power accordingly to the consumer type device as indicated by operation 205. For example, the partner device 108 is a regular device, VR 104 provides 25 mW output power, and if the partner device 108 is a HUB connector, the VR 104 provides 125 mW output power.

Upon exit of Standby, SoC 101 informs EC 103 about the end of Standby as indicated by operation 206. EC 103 then informs Host PD controller 102 about standby exit as indicated by operation 207. Host PD controller 102 reviews the command over CC pins. If the command is standby exit, then Host PD controller 102 sets the current input limit (ILIM) to RDO power as indicated by operation 208.

In Host System S0 active condition, if platform wake latency is not limited by USB link exit latency tolerance (e.g., 10 ms from U3 for USB3 Link) compared to ramping power to the Port, then the Host Port Power Save scheme of various embodiments can initiate "RDO No USB Suspend" through the PD controller 102 to lower the power levels to 25 mW/125 mW for BPD and HUB, respectively.

In Host System Standby condition, if exit latency is not limited by System exit latency tolerance compared to ramping power to the Port, then the Host Port Power Save scheme of various embodiments can initiate "RDO No USB Suspend" through the PD controller 102 to lower the power levels to 25 mW/125 mW for BPD and HUB, respectively.

In System ACPI Sx standby (e.g., S3 state) condition, if exit latency is not limited by System Sx exit latency tolerance compared to ramping power to the Port, then the Host Port Power Save scheme of various embodiments can initiate "RDO No USB Suspend" through the PD controller 102 to lower the power level drain to 25 mW/125 mW for BPD and HUB, respectively.

Under these conditions, the BPD or HUB is maintained with standby 25 mW/125 mW power, respectively. The standby power provides the capability to the partner device 108 to initiate a wake trigger. If the power ramp to the Port partner 108 from standby (e.g., 25 mW/125 mW) to operational power is limited by USB exit latency time, then the three above conditions (Host System S0 active condition, Host System Standby condition, and System ACPI Sx standby (e.g., S3 state) condition) may not be executed in that scenario. In that case, power leakage/drain may continue from the host system battery. Thus, in requirements where device-initiated wake is necessary, SoC 101 can save further power by negotiating with BPD and HUB PD controller 107 to lower the power levels to support a potential wake requirement.

Figure 3:
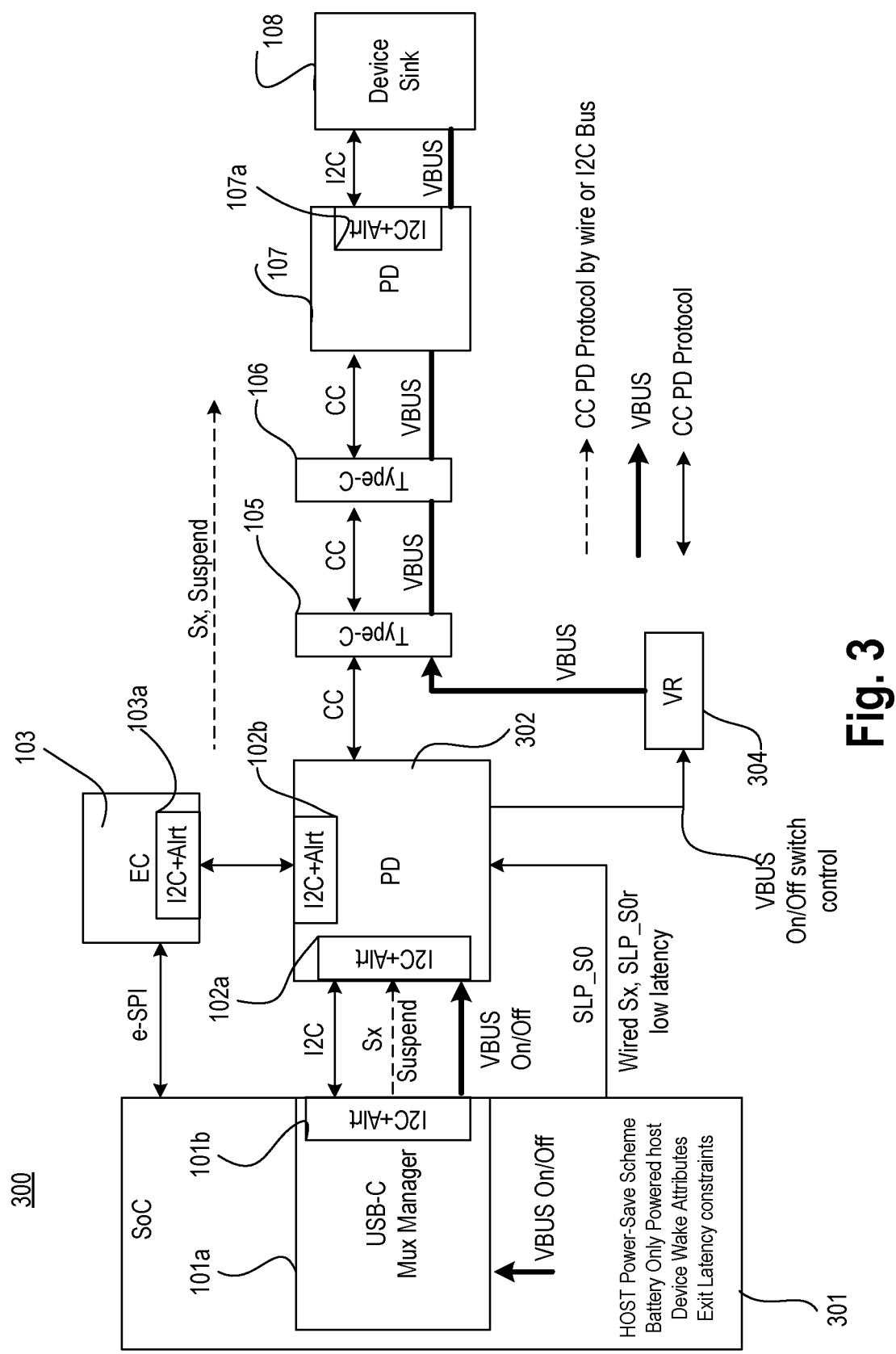
FIG. 3 illustrates a system showing a host and a sink device connected via a USB TYPE-C port, with standby communication with VBUS On/Off from the SoC, in accordance with some embodiments.

FIG. 3 illustrates system 300 showing a host and a sink device connected via a USB TYPE-C port, with standby communication with VBUS On/Off from the SoC, in accordance with some embodiments. System 300 is similar to system 100. Here, SoC 101 is relabeled as SoC 301 because it includes VBUS On/Off control that is provided to PD controller 302 (which is relabeled from PD controller 102).

VR 104 is relabeled as VR 304 to indicate capability of VBUS On/Off switch control.

As discussed herein, when Host Port Power Save scheme of various embodiments discovers there is no device-initiated wake requirement, but dependent on Host initiated wake from system Sleep-Standby, there is an excellent opportunity to cut the complete power off to the BPD, Hubs while also powering off platform and SoC wake power planes. The Host Port Power Save scheme can derive low latency exit constraints and decides to shut off the complete power to BPD and Hubs to save power. USB 3.2, USB4 and DP protocol device remote wake attributes listed in herein is used by the Host scheme of various embodiments to trigger its PD controller 302 to shutoff Power (e.g., Source Switch) to BPD and Hub. Thus, even the BPD or HUB standby power (e.g., 25 mW/125 mW) or leakage power is saved when the Host is powered by battery in Sleep and Standby modes. The Host algorithm of various embodiments communicate this information to PD controller 302 by the in-band I2C bus or a GPIO wire to PD controller 302. This sequence is described by FIG. 2 and FIG. 3.

In System S0 active condition, if the exit latency is not limited by Source (e.g., SoC 301) initiated link exit latency compared to ramping power to Port 105, then the Host Port Power Save scheme of various embodiments can initiate "VBUS Shut off" through PD controller 102/302.

In System Standby condition, if exit latency is not limited by System exit latency tolerance compared to ramping power to Port 105, then the Host Port Power Save scheme of various embodiments can initiate "VBUS Shut off" through PD controller 102/302.

In System ACPI Sx standby condition, if exit latency is not limited by System Sx exit latency tolerance compared to ramping power to the Port 105, then the Host Port Power Save scheme of various embodiments can avoid initiating "VBUS Shut off" through PD controller 102/302.

In requirements where Device initiated wake is not necessary, and wake is triggered from Host System 301, SoC 301 saves power by shutting off power to BPD and HUB and other System wake power planes. For a device which may not support wake and it is battery operated, the scheme of various embodiments can ensure to provide minimum power from host system 301 to avoid dead battery on the device. Host 301 may consider its own battery level and connected devices' battery level for the decision of minimum power, in accordance with some embodiments.

Figure 4:
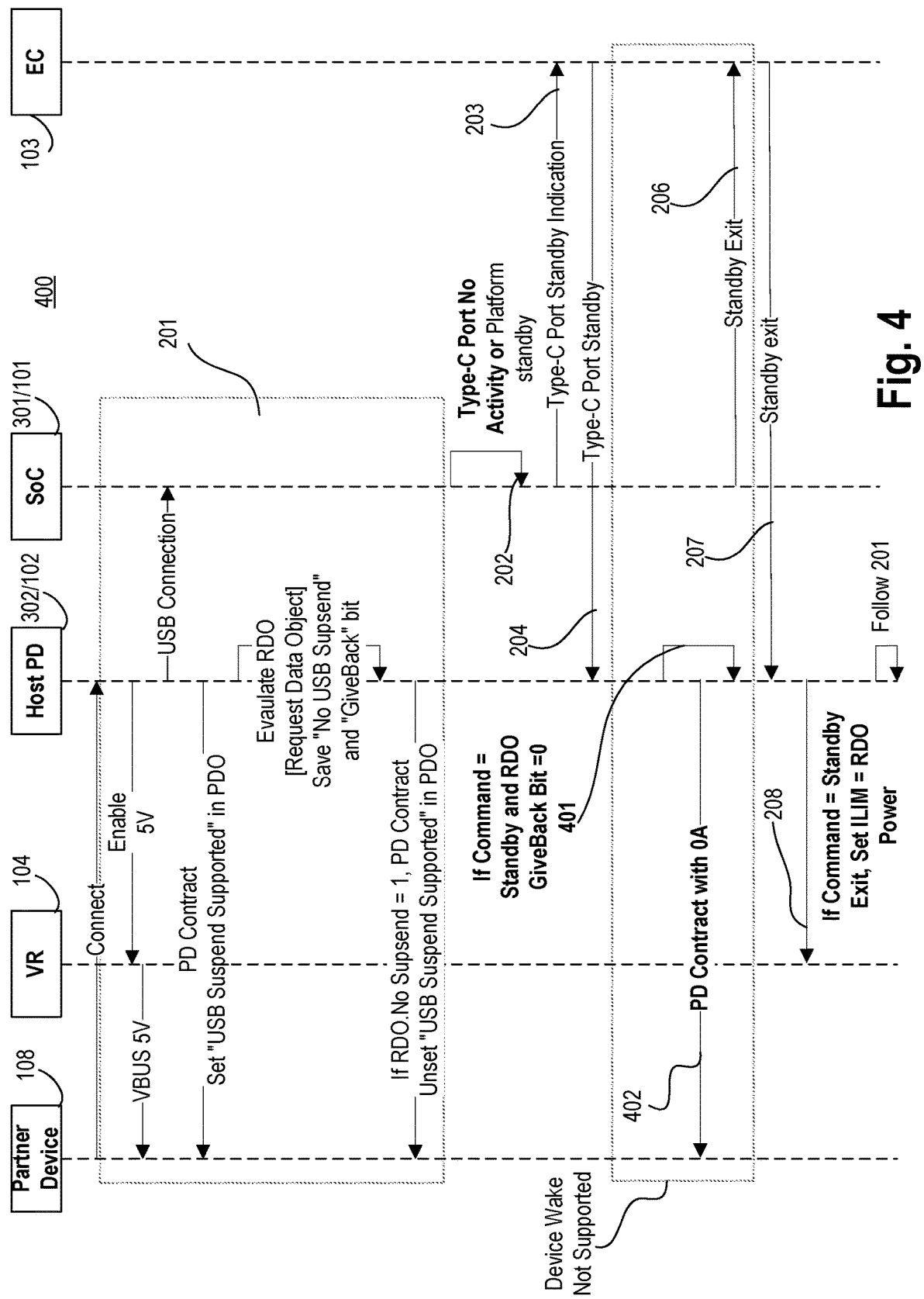
FIG. 4 illustrates a flowchart of an Advance Power and Communication Interface (ACPI) standby sequence with no device wake requirement, in accordance with some embodiments.

FIG. 4 illustrates flowchart 400 of an Advance Power and Communication Interface (ACPI) standby sequence with no device wake requirement, in accordance with some embodiments. While the blocks are shown in a particular order, the order can be modified. For example, some blocks may be performed in parallel, while some blocks can be performed before others. The various blocks can be performed by software, hardware, or a combination of then. For sake of brevity, differences between flowchart 400 and flowchart 200 are discussed. In some embodiment, host 301 decides to limit peripheral power based on ACPI defined standby with device-initiated wake requirement including exit latency not limited by power ramp from standby. In various embodiments, PD controller 302 detects standby from host 301 based on the sideband interface (e.g., wired SLP_S0, Sx signals for rapid reaction to keep low latency or through I2C for low latency). Policy of PD controller 302 decides to limit the power of partner device 108 by flowcharts 400 and 500.

After operation 204, as discussed with reference to flowchart 200/400, Host PD controller 102/302 checks whether USB TYPE-C port is in standby and RDO giveback bit is set to 0 as indicated by operation 401. If the USB TYPE-C port is in standby and RDO giveback bit is set to 0, Host PD controller 301/102 establishes a new power delivery contract with OA with partner device 108 as indicated by operation 402. The standby exit flow is same as that discussed with reference to flowchart 200.

When partner device or sink device 108 is PD communication capable, host PD scheme of various embodiments negotiates and store lower power mode capability utilizing PD specification, "No USB Suspend flag" in "Request Device Object" (RDO). In the first option, the Host/Source PD controller 302 instructs the on-board VR 304 to downscale the power (e.g., higher Voltage to 5V) if USB suspend is supported by the device negotiated at the early power contract phase operation 201. This reduces Device standby power 25 mW/125 mW (e.g., cut-off power based on DEVICE_REMOTE_WAKE). In the second option, when the first option is not available, the PD specification "Give-Back" bit is used by Host PD controller 302 to negotiate and establish a contract for 5V at OA (Standby Power). For non-PD capable device (e.g., USB Pen drive), Host PD controller 302 updates the VBUS VR 304 using a dedicated communication channel to downscale the power to achieve 25 mW/125 mW standby. As such, power is cut off if no wake is needed.

Figure 5:
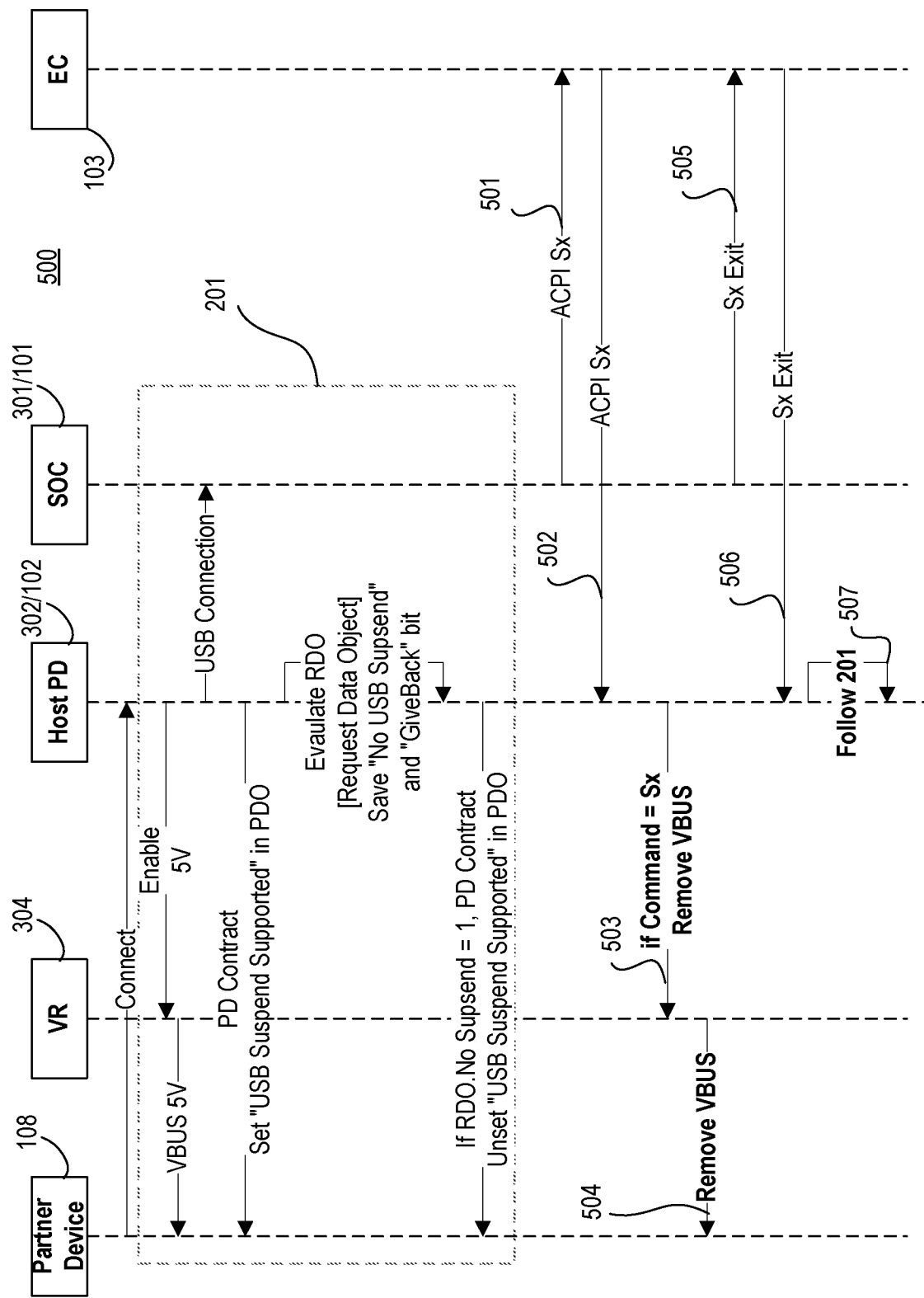
FIG. 5 illustrates a flowchart of an ACPI Sx sequence with VBUS removal and with no device wake requirement, in accordance with some embodiments.

FIG. 5 illustrates flowchart 500 of an ACPI Sx sequence with VBUS removal and with no device wake requirement, in accordance with some embodiments. While the blocks are shown in a particular order, the order can be modified. For example, some blocks may be performed in parallel, while some blocks can be performed before others. The various blocks can be performed by software, hardware, or a combination of then.

For sake of brevity, differences between flowchart 500 and flowchart 200 are discussed. After performing the set of operations, SoC 301 informs EC 103 about ACPI Sx sleep state as indicated by operation 501. EC 103 then informs Host PD controller 302 about the ACPI Sx state as indicated by operation 502. Alternatively, or in addition to, in some embodiments the SoC 301/101 can directly inform PD 302/102 via sideband of GPIO (e.g., wired Sx) of host PD controller 302. In operation 503, Host PD controller 302 instructs VR 304 to remove VBUS. VR 304 then removes the VBUS from partner device 108 as indicated by operation 504. Thereafter, the sleep exit flow is indicated by communications between SoC 301 and EC 103, and between EC 103 and SoC 301 as indicated by operations 505 and 506, respectively. The process then proceeds to operations 201 as indicated by operation 507. The various flowcharts discussed herein can be performed by an operating system executing on SoC 101 or 301, drivers, software, firmware (e.g., pCode in a power management unit).

On detecting Sleep (Sx) or S0ix from the sideband of GPIO of host PD controller 302, can operate the switch on the VBUS VR 304 to turn off to conserve more power without EC 103. In some embodiments, on detecting Sleep (Sx) or S0ix from the sideband of GPIO of host PD controller 302, can bring the VBUS back and move device 108 to operational state.

Elements of embodiments are also provided as a machine-readable medium (e.g., memory) for storing the computer-executable instructions (e.g., instructions to implement any other processes discussed herein). In some embodiments, a computing platform comprises a memory, a processor, a machine-readable storage media (also referred to as tangible machine readable medium), a communication interface (e.g., wireless or wired interface), and a network bus coupling them.

In some embodiments, the processor is a Digital Signal Processor (DSP), an Application Specific Integrated Circuit (ASIC), a general-purpose Central Processing Unit (CPU), or a low power logic implementing a simple finite state machine to perform the method of various embodiments, etc.

In some embodiments, the various logic blocks of the system are coupled together via the network bus. Any suitable protocol may be used to implement the network bus. In some embodiments, the machine-readable storage medium includes instructions (also referred to as the program software code/instructions) for intelligent prediction of processor idle time as described with reference to the various embodiments and flowchart.

Program software code/instructions associated with flowchart(s) (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart 500 (and/or various embodiments) are executed by the computer system.

In some embodiments, the program software code/instructions associated with flowchart 500 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with flowchart 500 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, magnetic random-access memory, ferroelectric memory, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, the tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

In some embodiments, the machine-readable storage media has machine-readable instructions stored there on, that when executed, cause one or more processors to perform a method comprising: detecting a device connected to a port; enabling power to the device; determining that the device connected to the port is inactive; initiating standby mode by sending standby indication to a power delivery controller; instructing a voltage regulator to reduce power to the device in response to the standby indication; and reducing power to the device. In some embodiments, the machine-readable storage media has machine-readable instructions stored there on, that when executed, cause the one or more processors to perform a further method comprising: sending a standby exit indication to an embedded controller; and setting current limit for the voltage regulator in response to the standby exit indication. In some embodiments, the port is a USB TYPE-C port. In some embodiments, the device is bus power device or a hub connected system. In some embodiments, reducing power to the device includes cutting power to a wake logic power plane. In some embodiments, the device does not use device-initiated wake. In some embodiments, the machine-readable storage media has machine-readable instructions stored there on, that when executed, cause the one or more processors to perform a further method comprising: sending a message to reduce or turn off power to the device via a API interface; and reading a flag to determine whether to keep a system wake logic power plane powered on when reducing power to the device. In some embodiments, the flag is a DEVICE_REMOTE_WAKEUP flag when the device is a USB 3.2 device. In some embodiments, the flag is a Router Configuration Space Basic Attribute when the device is a USB4 device.

Figure 6:
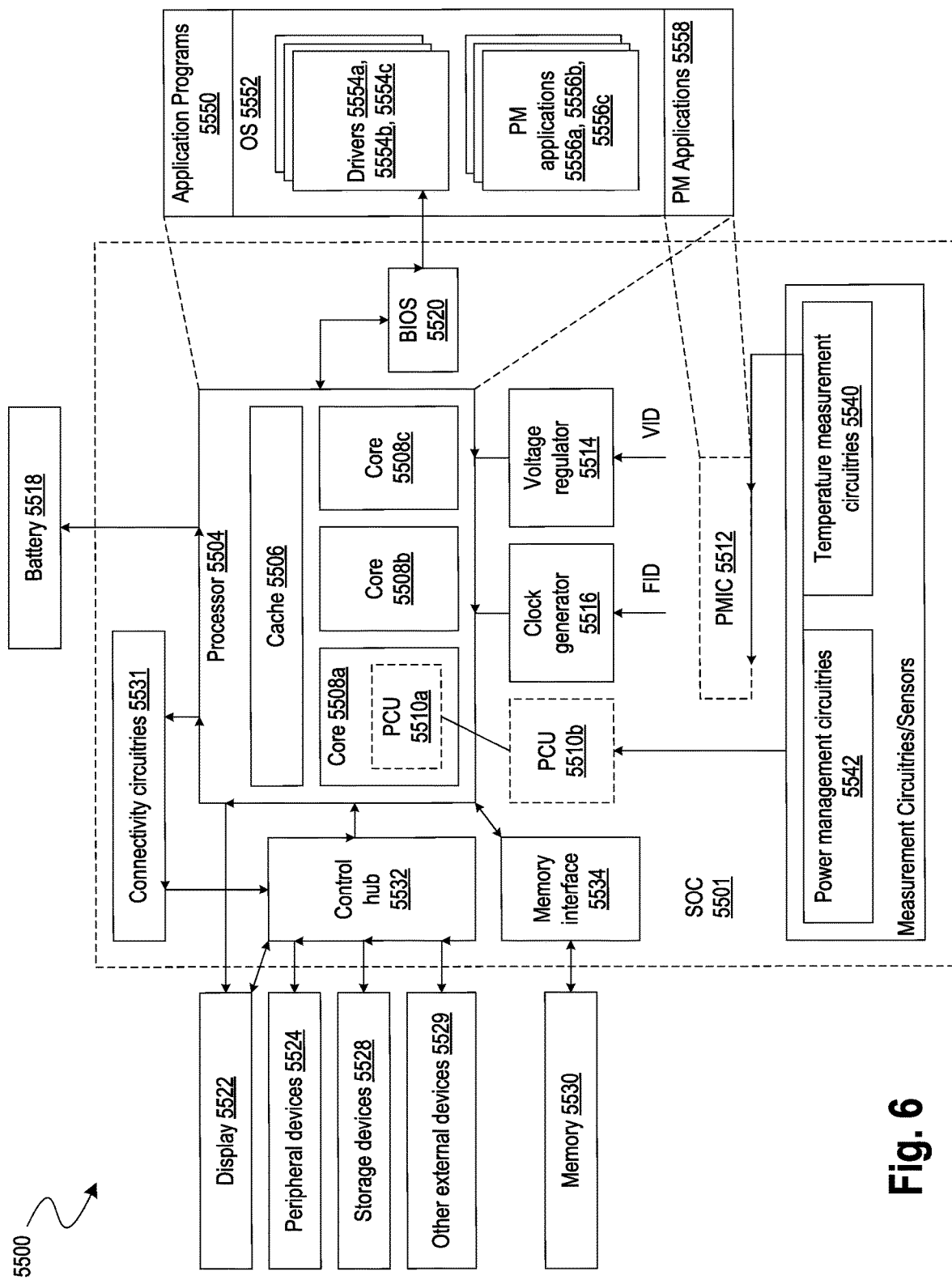
FIG. 6 illustrates a smart device or a computer SoC with apparatus and method to reduce standby power for systems in battery mode with a connected bus powered device, in accordance with some embodiments.

FIG. 6 illustrates a smart device or a computer SoC with apparatus and method to reduce standby power for systems in battery mode with a connected bus powered device, in accordance with some embodiments. It is pointed out that those elements of FIG. 6 having the same reference numbers (or names) as the elements of any other figure may operate or function in any manner similar to that described, but are not limited to such. Any block in this smart device can have the apparatus and method to reduce standby power for systems in battery mode with a connected bus powered device.

In some embodiments, discovery of device-initiated wake requirement implemented by the Host Port Power Save scheme of various embodiments is based on a protocol-based driver/FW features status and exit latency tolerance numbers. For example, for USB3.2 specification, Host Standard Device Request and subsequent Standard Feature selectors with "DEVICE_REMOTE_WAKEUP are used for discovery of device-initiated wake requirement. For USB4 specification, Router Configuration Space Basic Attributes with "Enable Wake" on PCIe, USB3, DP is used for discovery of device-initiated wake requirement. For DP specification, DPCD SET Power and SET_DP_PWR_VOLTAGE register is used for discovery of device-initiated wake requirement.

If the Type C Device initiated wake requirement is required with no limit to latency tolerance, then SoC to PD I2C in-band communication or the SUSPEND pin from SoC is used to configure BPD or HUB to enter/exit low leakage 25 mW/125 mW mode. If the Type C Device initiated wake requirement is required with no limit to latency tolerance, Host Port Power Save scheme of various embodiments triggers suspend via I2C interface to PD controller. In some embodiments, SoC GPIO pins to PD controller can also be utilized to reduce entry/exit latency. If the Type C Device initiated wake requirement is required with no limit to latency tolerance, PD protocol "RDO. No USB Suspend", UFP VDO2. USB3/4 Min power, Giveback, GOTO MIN, OA are used to negotiate for lowering power to BPD and HUB to 25 mW/125 mW. When Device initiated wake occurs, SoC can trigger the PD controller through I2C or GPIO pins to provide operational power to the BPD or HUB.

For USB TYPE-C Host, initiated wake only requirement inference which has no stringent latency tolerance requirements, Host Port Power Save Scheme preempts power cutoff via I2C interface to PD controller. In some embodiments, SoC GPIO pins and SLP_S0, Sx pins, eSPI virtual wires signaling can be also utilized to trigger PD controller to shutoff power to BPD or HUB devices while the SoC system can also shut its wake power planes. On a wake notification from SOC SLP_S0, SX pins, eSPI virtual wires to the PD can be triggered to again power the BPD or HUB devices.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 6, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508*a*, 5508*b*, 5508*c*. Although merely three cores 5508*a*, 5508*b*, 5508*c* are illustrated in FIG. 6, processor 5504 may include any other appropriate number of processing cores, e.g., tens, or even hundreds of processing cores. Processor cores 5508*a*, 5508*b*, 5508*c* may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508*a*, a second section of cache 5506 dedicated to core 5508*b*, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as BLUETOOTH, Near Field, etc.), local area networks (such as Wi-Fi), and/or wide area networks (such as WiMax™), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), THUNDERBOLT, HIGH DEFINITION MULTIMEDIA INTERFACE (HDMI), FIREWIRE, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), HIGH DEFINITION MULTIMEDIA INTERFACE (HDMI), FIREWIRE, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510a/b and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, battery 5518 is a multi-battery system with workload dependent load-sharing mechanism. The mechanism is an energy management system that operates in three modes—energy saving mode, balancer mode, and turbo mode. The energy saving mode is a normal mode where the multiple batteries (collectively shown as battery 5518) provide power to their own set of loads with least resistive dissipation. In balancing mode, the batteries are connected through switches operating in active mode so that the current shared is inversely proportion to the corresponding battery state-of-charge. In turbo mode, both batteries are connected in parallel through switches (e.g., on-switches) to provide maximum power to a processor or load. In some embodiments, battery 5518 is a hybrid battery which comprising a fast charging battery and a high energy density battery. Fast charging battery (FC) means a battery capable of faster charging than high energy density battery (HE). FC may be today's Li-ion battery as it is capable of faster charging than HE. In some embodiments, a controller (part of battery 5518) optimizes the sequence and charging rate for the hybrid battery to maximize both the charging current and charging speed of the battery, while enabling longer battery life.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510*a*. In an example, some other sections of PCU 5510 may be implemented outside the processing cores 5508, and these sections of PCU 5510 are symbolically illustrated using a dotted box and labelled as PCU 5510*b*. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

P-unit 5510 may include circuitry including hardware, software and/or firmware to perform power management operations. In some embodiments, p-unit 5510 provides control information to voltage regulator of the processor system via an interface to cause the voltage regulator to generate the appropriate regulated voltage. In some embodiments, p-unit 5510 provides control information to voltage regulators of cores 5508 via another interface to control the operating voltage generated (or to cause a corresponding voltage regulator to be disabled in a low power mode). In some embodiments, p-unit 5510 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). In some embodiments, p-unit 5510 is implemented as a microcontroller. The microcontroller can be an embedded microcontroller which is a dedicated controller or as a general-purpose controller. In some embodiments, p-unit 5510 is implemented as a control logic configured to execute its own dedicated power management code, here referred to as pCode. In some embodiments, power management operations to be performed by p-unit 5510 may be implemented externally to a processor 5501, such as by way of a separate power management integrated circuit (PMIC) or other component external to processor system 5501. In yet other embodiments, power management operations to be performed by p-unit 5510 may be implemented within BIOS or other system software. In some embodiments, p-unit 5510 may assume a role of a supervisor or supervisee.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., FLEXBUS) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, battery 5518 includes hybrid technologies. For example, a mix of high energy density charge (e.g., Li-ion batteries) carrying device(s) and low energy density charge carrying devices (e.g., supercapacitor) are used as batteries or storage devices. In some embodiments, a controller (e.g., hardware, software, or a combination of them) is used analyze peak power patterns and minimizes the impact to overall lifespan of high energy density charge carrying device-based battery cells while maximizing service time for peak power shaving feature. The controller may be part of battery 5518 or part of p-unit 5510*b*.

In some embodiments, pCode executing on PCU 5510*a/b* has a capability to enable extra compute and telemetries resources for the runtime support of the pCode. Here pCode refers to a firmware executed by PCU 5510*a/b* to manage performance of the SoC 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc.pk SoC Peak Power Limit (e.g., PL4), according to the threshold voltage (Vth). These are two dependent parameters, if one is set, the other can be calculated, pCode is used to optimally set one parameter (Vth) based on the system parameters, and the history of the operation. In some embodiments, pCode provides a scheme to dynamically calculate the throttling level (Psoc.th) based on the available battery power (which changes slowly) and set the SoC throttling peak power (Psoc.th). In some embodiments, pCode decides the frequencies and voltages based on Psoc.th. In this case, throttling events have less negative effect on the SoC performance. Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554*a*, 5554*b*, 5554*c*). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, a hardware and software coordinated processor power state policy (e.g., policy for C-state) is implemented that delivers optimal power state selection by taking in to account the performance and/or responsiveness needs of thread expected to be scheduled on the core entering idle, to achieve improved instructions per cycle (IPC) and performance for cores running user critical tasks. The scheme provides the ability to deliver responsiveness gains for important and/or user-critical threads running on a system-on-chip. P-unit 5510 which coupled to the plurality of processing cores, receives a hint from operating system 5552 indicative of a bias towards a power state or performance state for at least one of the processing cores of the plurality of processing cores based on a priority of a thread in context switch.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies. Each processor 103 may also be a dielet or chiplet. Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to as an Autonomous Perimeter (AP). A domain can be an entire system-on-chip (SoC) or part of the SoC, and is governed by a p-unit.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here, the term "interconnect" refers to a communication link, or channel, between two or more points or nodes. It may comprise one or more separate conduction paths such as wires, vias, waveguides, passive components, and/or active components. It may also comprise a fabric.

Here the term "interface" generally refers to software and/or hardware used to communicate with an interconnect. An interface may include logic and I/O driver/receiver to send and receive data over the interconnect or one or more wires.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front." "back," "top," "bottom," "over," "under." and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Various embodiments are described as examples. The examples can be combined in any suitable manner. For instance, example 5 can be combined with example 3 and/or example 7.

Example 1: A machine-readable storage media having machine-readable instructions stored there on, that when executed, cause one or more processors to perform a method comprising: detecting a device connected to a port; enabling power to the device; determining that the device connected to the port is inactive; initiating standby mode by sending standby indication to a power delivery controller; instructing a voltage regulator to reduce power to the device in response to the standby indication; and reducing power to the device.

Example 2: The machine-readable storage media of example 1, having machine-readable instructions stored there on, that when executed, cause the one or more processors to perform a further method comprising: sending a standby exit indication to an embedded controller or a PD controller; and setting current limit for the voltage regulator in response to the standby exit indication.

Example 3: The machine-readable storage media of example 1, wherein the port is a USB TYPE-C port.

Example 4: The machine-readable storage media of example 1, wherein the device is bus power device or a hub connected system.

Example 5: The machine-readable storage media of example 1, wherein reducing power to the device includes cutting power to a wake logic power plane.

Example 6: The machine-readable storage media of example 1, wherein the device does not use device-initiated wake.

Example 7: The machine-readable storage media of example 1, having machine-readable instructions stored there on, that when executed, cause the one or more processors to perform a further method comprising: sending a message to reduce or turn off power to the device via a API interface.

Example 8: The machine-readable storage media of example 1, having machine-readable instructions stored there on, that when executed, cause the one or more processors to perform a further method comprising: reading a flag to determine whether to keep a system wake logic power plane powered on when reducing power to the device.

Example 9: The machine-readable storage media of example 8, wherein the flag is a DEVICE_REMOTE_WAKEUP flag when the device is a USB 3.2 device.

Example 10: The machine-readable storage media of claim 8, wherein the flag is a Router Configuration Space Basic Attribute when the device is a USB4 device.

Example 11: A system comprising: a processor; a power delivery controller coupled to the processor; a port coupled to the power delivery controller; an embedded controller coupled to the power delivery controller and the processor; and a voltage regulator coupled to the port, wherein the processor is to: detect a device connected to the port; enable power to the device; determine that the device connected to the port is inactive; initiate standby mode by sending standby indication to the power delivery controller via the embedded controller; and instruct the voltage regulator to reduce power to the device in response to the standby indication.

Example 12: The system of example 11, wherein the processor to: send a standby exit indication to the embedded controller or PD controller; and set current limit for the voltage regulator in response to the standby exit indication.

Example 13: The system of example 11, wherein the port is a USB TYPE-C port.

Example 14: The system of example 11, wherein the device is bus power device or a hub connected system.

Example 15: The system of example 11, wherein the processor is to cut power to a wake logic power plane.

Example 16: The system of example 11, wherein the processor is to read a flag to determine whether to keep a system wake logic power plane powered on when it is to reduce power to the device.

Example 17: The system of example 16, wherein the flag is a DEVICE_REMOTE_WAKEUP flag when the device is a USB 3.2 device, or wherein the flag is a Router Configuration Space Basic Attribute when the device is a USB4 device.

Example 18: An apparatus comprising: a memory to store instructions; and a processor coupled to the memory, wherein the processor is to execute the instructions which include: detecting a device connected to a port; enabling power to the device; determining that the device connected to the port is inactive; initiating standby mode by sending standby indication to a power delivery controller; instructing a voltage regulator to reduce power to the device in response to the standby indication; and reducing power to the device.

Example 19: The apparatus of example 18, wherein the instructions include: sending a standby exit indication to an embedded controller; setting current limit for the voltage regulator in response to the standby exit indication; and reading a flag to determine whether to keep a system wake logic power plane powered on when the processor is to reduce power to the device.

Example 20: The apparatus of example 18, wherein the flag is a DEVICE_REMOTE_WAKEUP flag when the device is a USB 3.2 device, or wherein the flag is a Router Configuration Space Basic Attribute when the device is a USB4 device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A non-transitory machine-readable storage media having machine-readable instructions stored thereon, that when executed, cause one or more processors to:
   detect a device connected to a port, wherein the device does not use a device-initiated wake;
   enable power to the device;
   determine that the device connected to the port is inactive;
   initiate a standby mode by sending a standby indication to a power delivery controller;
   instruct a voltage regulator to reduce power to the device in response to the standby indication; and
   reduce power to the device.

2. The non-transitory machine-readable storage media of claim 1, having machine-readable instructions stored thereon, that when executed, cause the one or more processors to:
   send a standby exit indication to an embedded controller or power delivery controller; and
   set a current limit for the voltage regulator in response to the standby exit indication.

3. The non-transitory machine-readable storage media of claim 1, wherein the port is a USB TYPE-C port.

4. The non-transitory machine-readable storage media of claim 1, wherein the device is a bus-powered device or a hub-connected system.

5. The non-transitory machine-readable storage media of claim 1, wherein reducing power to the device includes cutting power to a wake logic power plane.

6. The non-transitory machine-readable storage media of claim 1, having machine-readable instructions stored thereon, that when executed, cause the one or more processors to:
   send a message to reduce or turn off power to the device via an application programming interface.

7. The non-transitory machine-readable storage media of claim 1, having machine-readable instructions stored thereon, that when executed, cause the one or more processors to:
   read a flag to determine whether to keep a system wake logic power plane powered on when reducing power to the device.

8. The non-transitory machine-readable storage media of claim 7, wherein the flag is a DEVICE_REMOTE_WAKEUP flag.

9. The non-transitory machine-readable storage media of claim 7, wherein the flag is a Router Configuration Space Basic Attribute.

10. A system, comprising:
    a processor;
    a power delivery controller coupled to the processor;
    a port coupled to the power delivery controller;
    an embedded controller coupled to the power delivery controller and the processor; and
    a voltage regulator coupled to the port, wherein the processor is to:
    detect a device connected to the port;
    enable power to the device;
    determine that the device connected to the port is inactive;
    initiate a standby mode by sending a standby indication to the power delivery controller via the embedded controller;
    instruct the voltage regulator to reduce power to the device in response to the standby indication; and
    read a flag to determine whether to keep a system wake logic power plane powered on when the processor is to reduce power to the device.

11. The system of claim 10, wherein the processor is to:
    send a standby exit indication to the embedded controller or the power delivery controller; and
    set a current limit for the voltage regulator in response to the standby exit indication.

12. The system of claim 10, wherein the port is a USB Type-C port.

13. The system of claim 10, wherein the device is a bus-powered device or a hub-connected system.

14. The system of claim 10, wherein the processor is to cut power to a wake logic power plane.

15. The system of claim 10, wherein the flag is a DEVICE_REMOTE_WAKEUP flag.

16. The system of claim 10, wherein the flag is a Router Configuration Space Basic Attribute.

17. An apparatus, comprising:
    a memory to store instructions; and
    a processor coupled to the memory, wherein the processor is to execute the instructions to:
    detect a device connected to a port;
    enable power to the device;
    determine that the device connected to the port is inactive;
    initiate a standby mode by sending a standby indication to a power delivery controller;
    instruct a voltage regulator to reduce power to the device in response to the standby indication;
    reduce power to the device;
    determine whether the device is remote wake capable; and
    based on whether the device is remote wake capable, determine whether to keep a system wake logic power plane powered on when the processor is to reduce power to the device.

18. The apparatus of claim 17, wherein the processor is to execute the instructions to:
    send a standby exit indication to an embedded controller; and
    set current limit for the voltage regulator in response to the standby exit indication.

19. The apparatus of claim 17, wherein to determine whether the device is remote wake capable, the processor is to execute the instructions to read a DEVICE_REMOTE_WAKEUP flag.

20. The apparatus of claim 17, wherein to determine whether the device is remote wake capable, the processor is to execute the instructions to read a Router Configuration Space Basic Attribute.

* * * * *